United States Patent [19]
Clark

[11] 3,982,725
[45] Sept. 28, 1976

[54] VALVE ACTUATOR

[75] Inventor: Malcolm D. Clark, Glascow, Scotland

[73] Assignee: Keystone International, Inc., Houston, Tex.

[22] Filed: June 27, 1974

[21] Appl. No.: 483,667

[52] U.S. Cl. .................................. 251/14; 92/136; 92/69 R; 251/58
[51] Int. Cl.² .................... F01B 9/04; F16K 31/163
[58] Field of Search ................... 92/136, 69 R, 138; 251/58, 14; 91/391

[56] References Cited
UNITED STATES PATENTS

| | | |
|---|---|---|
| 2,844,127 | 7/1958 | Steiner ........................... 92/136 X |
| 2,844,128 | 7/1958 | Steiner ........................... 92/136 |
| 2,957,361 | 10/1960 | Herbenar ........................ 92/68 X |
| 3,148,595 | 9/1964 | Looney ........................... 92/136 X |
| 3,260,496 | 7/1966 | Borcherdt ....................... 92/138 X |
| 3,650,506 | 3/1972 | Bruton ............................ 251/58 X |

Primary Examiner—Arnold Rosenthal
Attorney, Agent, or Firm—Browning & Bushman

[57] ABSTRACT

A low profile fluid powered actuator particularly for valves of the type in which the valve element is rotated to open and close the flow passageway through the valve body, the actuator having a novel internal porting system, means for direct attachment of the valve stem to the shaft of the actuator, and a novel manual override for manually operating the valve.

14 Claims, 5 Drawing Figures

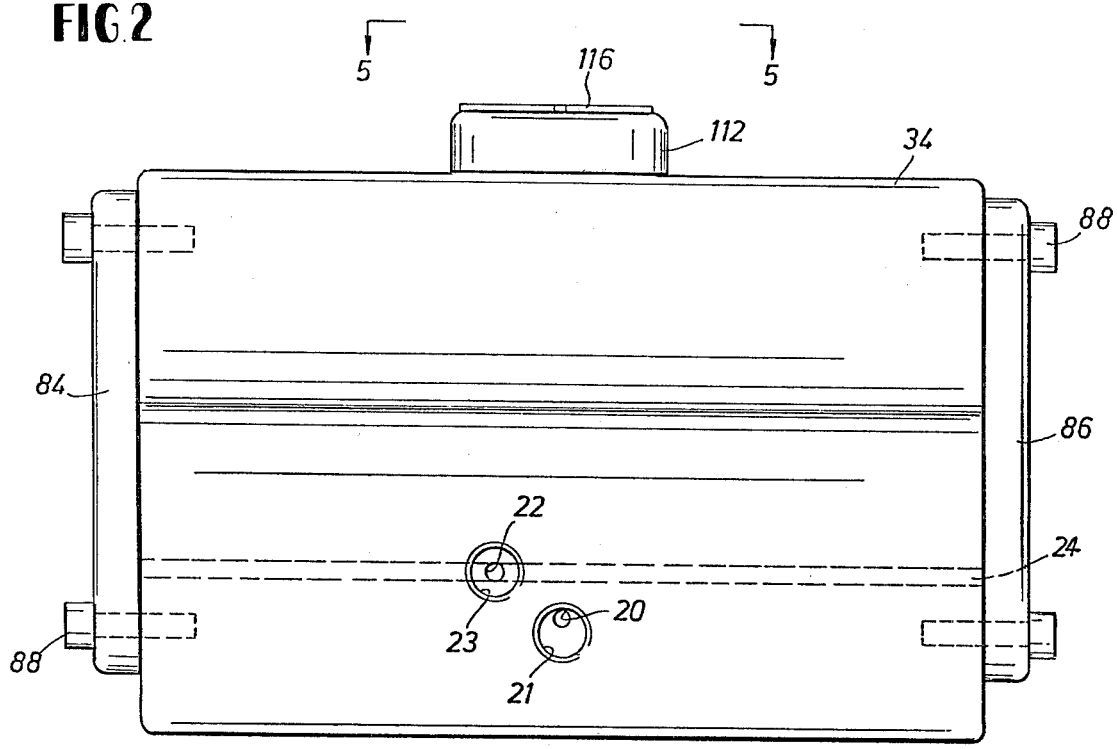
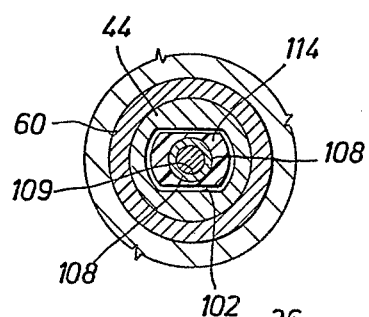
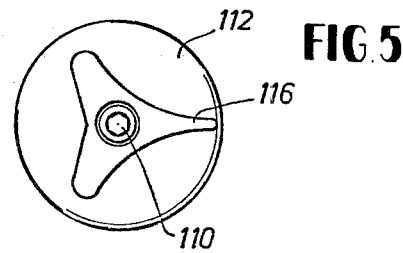
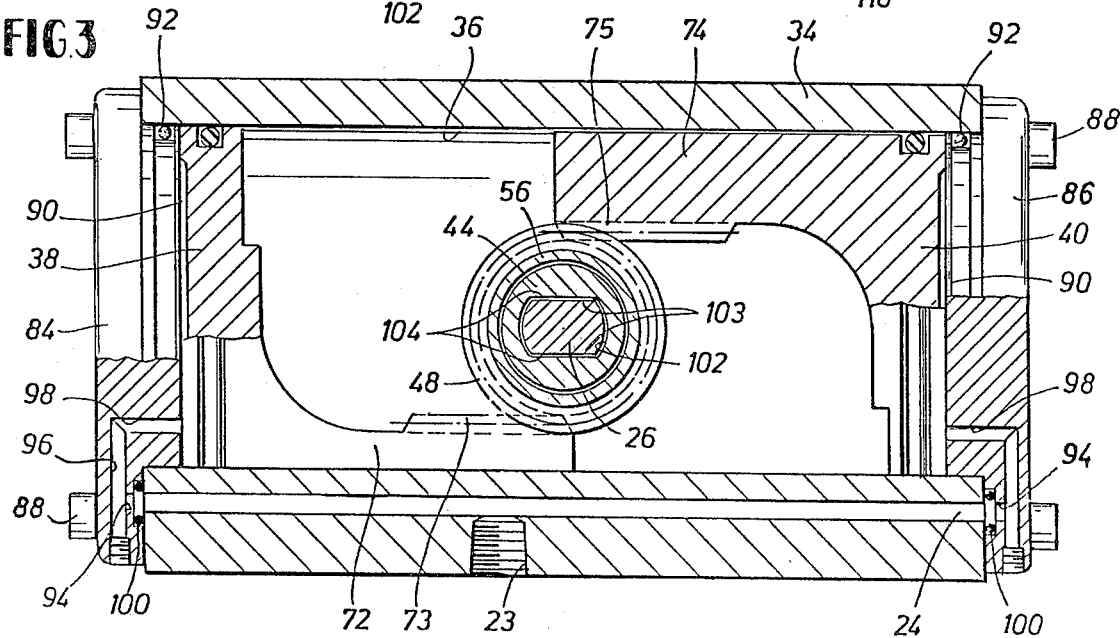

VALVE ACTUATOR

BACKGROUND OF THE INVENTION

1. Field of the Invention

The present invention relates to fluid powered actuators or motors, and more particularly, to actuators for operating valves such as ball valves or butterfly valves in which the valve element is rotated to open or close the flow passageway through the valve body.

Many types of pneumatic and hydraulic actuators have been designed for automatically operating various types of valves and other similar devices. In such actuators it is desirable that they have a low profile and, in general, occupy a minimum amount of space; additionally it is advantageous to minimize the number of parts needed to connect the valve to the actuator mechanism thus minimizing the space occupied by the combined valve-actuator system. It is also desirable to devise a mechanism in which the valve and/or the parts which connect the valve stem to the actuator mechanism are protected or shielded.

The actuator of the present invention accomplishes these results by means of its novel construction and manner of connection to the valve.

2. Description of the Prior Art

U.S. Pat. No. 2,957,361 to Herbenar discloses an actuator for a power steering mechanism. The actuator in question comprises a cylinder having two pistons therein which can move simultaneously toward and away from the middle of the cylinder. Each piston has a skirt extending toward the center of the cylinder and these skirts are located on radially opposite sides of the cylinder. The skirts have gear racks on their inner surfaces which operate a pinion wheel mounted on a shaft extending transversely through the cylinder.

One of the problems of the actuator shown in the Herbenar patent is that the porting systems which provide hydraulic or pneumatic fluid to the cylinder are comprised of tubes located externally of the cylinder. These tubes increase the profile of the actuator and, being relatively small and fragile, are subject to breakage and damage. Another problem is that a relatively complicated mechanism is used to connect the actuator shaft to another shaft which is to be turned by the actuator. This further increases the profile of the mechanism.

U.S. Pat. No. 3,107,080 to Priese discloses a fluid powered actuator for a ball valve in which the porting systems are internal to the actuator cylinder or housing. However the passageways which supply fluid to the ends of the cylinder discharge almost directly between the ends of the cylinder and the end plates making the device subject to leakage. Furthermore the actuator shaft and the valve stem to be turned thereby are one integral piece. The relative inflexibility of this arrangement together with orientation of the actuator housing with respect to the valve body necessitates a relatively long portion of the stem extending between the valve and the actuator housing. This increases the profile of the valve-actuator combination and also makes it necessary to provide a shroud or bonnet to cover this portion of the stem and to rigidly connect the valve body to the actuator housing.

SUMMARY OF THE INVENTION

The actuator of the present invention includes a housing having a piston passageway or cylinder therethrough which serves as a cylinder for a pair of pistons. The pistons have radially opposed skirts with gear racks on their inner surfaces to operatively engage a pinion wheel in the center of the piston passageway. The pinion wheel is affixed to a shaft extending through the housing and the piston passageway, the shaft being rotatably mounted in a shaft bore in the housing, the shaft bore passing transversely through the piston passageway. A pair of end or cover plates are secured to the ends of the housing to close the ends of the piston passageway.

Internal porting passageway systems are provided in the housing and cover plates to deliver a driving fluid to the actuator. Fluid may be injected into the center of the cylinder between the pistons while being simultaneously vented from the ends of the cylinder beyond the pistons thus causing the pistons to move longitudinally outwardly toward the ends of the cylinder.

By reversing the fluid flow and venting process, the pistons are urged toward one another. Since the pistons, via the rack and pinion assembly, are operatively connected to the shaft, the latter is caused to rotate first in one direction and then in the opposite direction.

When used in combination with a valve, the shaft of the actuator is connected to the valve stem which in turn is affixed to a suitable valve element.

Thus for example, to open or close the valve, fluid would be injected into and vented from the actuator in the above described manner. The resulting longitudinal movement of the pistons toward and away from one another would rotate the pinion wheel, shaft, valve stem, and valve element back and forth causing opening and closing of the valve. Of course the valve could be stopped in any desired position between the completely open position and the completely closed positions by control of the driving fluid.

In a preferred embodiment of the invention, the actuator shaft does not extend beyond the housing but is provided with a longitudinal stem bore. The valve stem is connected to the shaft simply by being placed within this bore. The bore has wrench surfaces which engage mating surfaces on the valve stem to prevent relative rotation between the shaft and stem. This means of connecting the shaft and valve stem eliminates elaborate connecting parts and allows the actuator to be placed quite close to the valve body eliminating the need for protective shields, bonnets, etc., and providing a low profile. At the same time, it provides sufficient flexibility between the actuator shaft and the valve stem to eliminate the need for rigid attachment of the actuator housing to the valve body.

The low profile of the actuator is also enhanced by the internal porting systems and by the orientation of the actuator with respect to the valve body.

The actuator of the invention also includes novel manual override means for manually operating the valve. In the preferred form, a rod receiving bore is formed in the actuator opposite the stem bore. A rod is located within this bore, both the rod and the bore having mating wrench surfaces. Preferably, the rod fits entirely within the bore when the override means is not in use to reduce the profile of the device. When the manual override means is to be used, the rod is drawn partially out of the bore by suitable means, gripped and rotated with a wrench.

It is therefore a principal object of the present to provide a low-profile fluid powered actuator.

It is another object of the invention to provide an actuator having a portion of an internal porting passageway system extending through its cover plates.

Yet another object of the invention is to provide an actuator-valve combination in which there is direct connection between the valve stem and the shaft of the actuator.

One more object of the invention is to provide a valve actuator which eliminates the need for protective shields for the valve stem.

One other object of the invention is to provide an actuator having a unique manual override means.

Other object, features, and advantages of the invention will be made apparent by the following detailed description, the claims, and the drawings.

BRIEF DESCRIPTION OF THE DRAWINGS

FIG. 2 is an elevational view of the actuator taken along lines 2—2 of FIG. 1.

FIG. 3 is a cross-sectional view taken along the lines 3—3 of FIG. 1.

FIG. 4 is a cross-sectional view taken along lines 4—4 of FIG. 1.

FIG. 5 is a plan view taken along lines 5—5 of FIG. 2.

DESCRIPTION OF THE PREFERRED EMBODIMENTS

Figure 1:
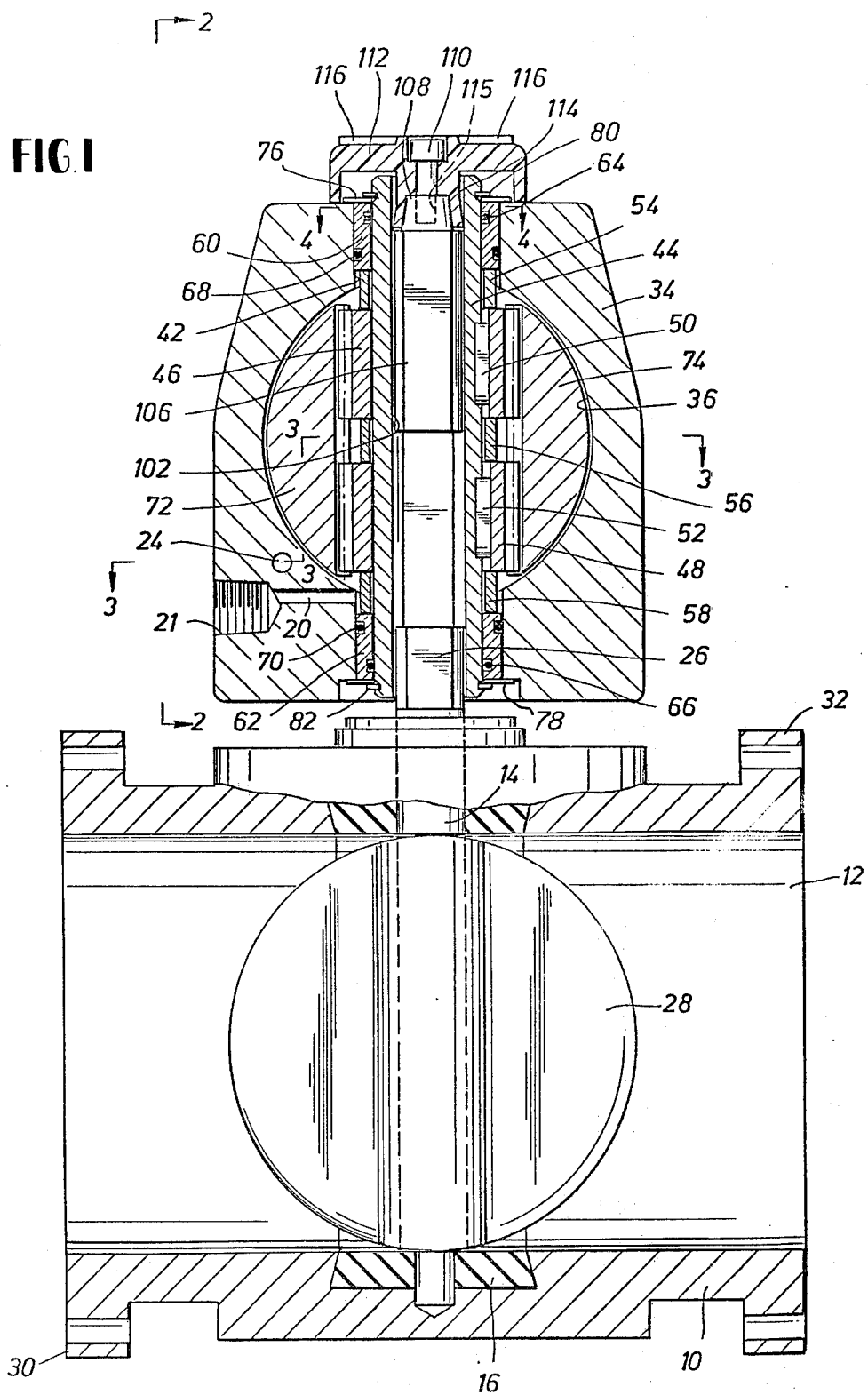
FIG. 1 is a vertical cross-sectional view of a valve and actuator according to the invention.

Referring now to the drawings, there is shown a conventional butterfly valve comprising a valve body 10 having a flow passageway 12 therethrough. A valve stem 14 is disposed in the flow passageway 12 generally perpendicular to the axis of passageway 12. Valve stem 14 is mounted for rotation in bearings, not shown, in the valve body 10 and has a free end 26 which extends outwardly from the valve body 10. A discshaped valve element 28 is rigidly mounted on the valve stem 14 in the flow passageway 12. The valve element or disc 28 is sized to fit tightly against the seal 16 in the flow passageway 12 when it is in its closed position, i.e. 90° from the open position shown in FIG. 1. Annular flanges 30 and 32 are formed on the valve body 10 at opposite ends of the flow passageway 12 for connecting the valve body to a pipe line or the like.

Associated with the valve is a valve actuator comprising a housing 34 having a cylindrical piston passageway 36 therethrough. Passageway 36 serves as a cylinder for a pair of pistons 38 and 40. A shaft bore 42 extends through the top and bottom walls of housing 34 transversely to and intersecting passageway 36 at a right angle. An actuator shaft 44 is rotatably mounted in the shaft bore 42 and extends transversely through the piston passageway 36. A pair of pinion wheels 46 and 48 surround and are fixedly secured to shaft 44 in a position within the passageway 36.

The pinion wheels 46 and 48 are keyed to the shaft 44 by respective keys 50 and 52 to prevent relative rotation between the pinion wheels and the shaft. Relative axial movement between the pinion wheels 46 and 48 and the shaft 44 is prevented by snug fitting spacer rings 54, 56, and 58 surrounding the shaft adjacent the ends of the pinion wheels. Bearings 60 and 62 mount the shaft 44 for rotation in the upper and lower parts of bore 42. The bearings 60 and 62 are sealed against the shaft 44 by respective o-rings 64 and 66 and against the walls of the bore 42 by respective o-rings 68 and 70. The shaft 44 is held in place in the bore 42 by retaining rings 76 and 78 which are in turn held by respective snap rings 80 and 82.

The pistons 38 and 40 have respective skirts 72 and 74 extending longitudinally therefrom along the walls of the piston passageway 36. The skirts 72 and 74 are disposed on radially opposite sides of the piston passageway 36, skirts 72 and 74 having racks, 73 and 75, respectively, on their respective radially inner surfaces. The racks 73 and 75 operatively engage the pinion wheels 46 and 48. It will be apparent from FIG. 3 that simultaneous movement of the pistons 38 and 40 toward their respective ends of the piston passageway 36 will cause rotation of the pinion wheels 46 and 48 and the attached shaft 44 in one direction, and that movement of the pistons toward the pinion wheels will cause rotation in the other direction. The shaft 44 is attached to the valve stem 14 in a manner to be more fully described below so that rotation of the shaft 44 changes the position of the valve stem 14 and valve element 28. As shown, the outermost position of the pistons 38 and 40 corresponds to the open position of the valve element, and the innermost position of the pistons corresponds to the closed position of the valve element.

In order to provide pneumatic fluid to the piston passageway 36, internal porting passageway systems are provided in the housing 34. A passageway 20 extends from the exterior of the housing 34 to the central portion of the piston passageway 36 between the pistons 38 and 40 and clear of the skirts 72 and 74. A threaded connection 21 is provided at the outer end of passageway 20.

Another porting system includes a portion in the housing 34 as well as portions in each one of a pair of cover plates 84 and 86 which are secured to the ends of the housing 34 by bolts 88 so as to close the piston passageway 36. The portion in the housing 34 includes a passageway 22 extending from the exterior of the housing 34 inwardly. A threaded connection 23 is provided at the outer end of passageway 22. Passageway 22 intersects another passageway 24 which runs generally parallel to the piston passageway 36 through the entire length of the housing 10.

Each of the cover plates 84 and 86 has a circular, plug-like portion 90 which extends into the piston passageway 36 and is sealed against the walls of the passageway 36 by an o-ring 92. Each end of the passageway 24 registers with a short parallel passageway 94 in one of the cover plates. O-rings 100 are disposed in annular grooves in the cover plates 84 and 86 between the ends of passageway 24 and the passageways 94. Passageways 94 intersect generally radial passageways 96 in the cover plates 84 and 86, and passageways 96 in turn intersect passageways 98 which extend through the plug-like portions 90 of the cover plates 84 and 86 into the ends of the piston passageway 36. The plug-like portions 90 make possible the use of seals, i.e. o-rings 92, against the inner surfaces of the passageway 36 as opposed to the end surfaces of the housing. This, together with the fact that the discharge points of the passageways 98 are located in the plug-like portions 90 radially and longitudinally inwardly of the o-ring seals 90, prevents leakage of the driving fluid during normal operating conditions.

It will be apparent from the drawings that the injection of pneumatic driving fluid into the central part of the passageway 36 between the pistons while venting the porting system connected to the cylinder 30 beyond the pistons will cause the pistons to move toward the ends of passageway 36 opening the valve. The reverse operation will cause the pistons 38 and 40 to move inwardly toward the pinion wheels 46 and 48 closing the valve. As is well known in the art, an automatic control system for selectively injecting pressurized fluid through either one of the porting systems while venting the other system is preferably used with the actuator.

It will also be appreciated that the internal porting system reduces the profile of the actuator and, to a great extent, eliminates small fragile tubes which are susceptible to breakage or damage.

The manner in which the actuator is connected to the valve further reduces the profile of the apparatus. The shaft 44 has a longitudinal bore 102 therein. In the embodiment shown, the bore 102 extends through the entire length of the shaft 44; however it could be made to extend only partially through the shaft. The bore 102 has wrench surfaces 103 therein. As shown in FIGS. 1–5, the bore 102 is somewhat rectangular in cross section with the straight side surfaces 103 serving as the wrench surfaces.

Referring again to FIGS. 1–5, the free end 26 of the valve stem 14 is received within the bore 102. The free end 26 of the valve stem 14 is also somewhat rectangular in cross section having mating wrench surfaces 104 to engage the wrench surfaces 103 in the bore 102. The wrench surfaces 103 and the mating surfaces 104 of the valve stem 14 cooperate to prevent relative rotation between the shaft 44 and the valve stem so that rotation of the shaft 44 operates the valve. This manner of connecting the valve stem to the shaft of the actuator eliminates the need for additional parts. Additionally, the shaft 44 is contained substantially entirely within the actuator housing 34. Thus the actuator housing 34 can be placed quite close to the valve body 10. No additional shield or the like is needed to protect the connected ends of the shaft 44 and the stem 14 as both are disposed within and protected by the actuator housing 34.

In some valves, the flanges 30 and 32 are much larger and extend upwardly from the valve body beyond the locus of the bottom of the actuator housing 34. However by disposing the actuator so that the piston passageway 36 is perpendicular, or at least transverse, to the flow passageway 12 as shwon in FIG. 1, the actuator can fit down between the flanges 30 and 32 and can still be placed quite close to the valve body 10.

The actuator of the present invention also includes manual override means for manually operating the valve if the actuator should fail. The bore 102 serves as a rod receiving bore at its upper end and contains a rod 106. The flat, parallel side surfaces 103 of the bore 102 again serve as wrench surfaces for the rod receiving bore, the rod 106 having a shape complimentary to the cross-sectioned shape of bore 102 thus providing mating wrench surfaces thereon. At the upper end of the rod 106 is a tapered end portion 108 having a threaded bore 109 extending axially inwardly. A resilient seal comprising a cap 112 and a hub 114 seals off bore 102. Hub 114 has a bore 115 into which fits tapered portion 108, hub 114 projecting into bore 102 between the inner surfaces of the bore 102 and portion 108. A threaded stud 110 extends through a hole in cap 112 and hub 114 and is threaded into the bore 109 of portion 108. During ordinary operation, the rod 106, which is slidable in the bore 102, is disposed entirely within said bore and the cap 112 rests on the top of the actuator housing 34 as shown in FIGS. 1 and 2. Thus the override means does not extend the profile during ordinary operation. In this position the stud 110 can be screwed tightly into the tapered portion 108. Hub 114, being somewhat flexible or resilient, is thus urged radially outwardly and into engagement with the inner surfaces of the bore 102 thereby forming a seal. This prevents dirt and contaminants from entering the mechanism through the bore 102.

When the manual override means is to be used, the stud 110 is loosened sufficiently to release the seal at hub 114. However, the stud 110 remains loosely threaded into rod 106 so that, together with the cap 112 which supports the stud 110, it forms withdrawing means for pulling rod 106 partially out of the bore 102. A conventional wrench is then used to grip the part of rod which extends out of the bore 102 and rotate the rod. The torque is transmitted through shaft 44 to the valve stem 14 and the valve is thus manually operated. A pointer 116 is provided on the cap 112 to indicate to the operator the position of the valve element 28. When the manual override means is no longer needed, the cap 112 can be lowered and the stud tightened again.

I claim:
1. A fluid powered actuator comprising:
 a housing having a cylindrical piston passageway therethrough and a shaft bore therein, said shaft bore being transverse to and intersecting said piston passageway;
 a shaft rotatably mounted in said shaft bore and extending through said piston passageway, said shaft being disposed substantially entirely within said housing and having a longitudinal bore extending through the entire length of said shaft, said bore having wrench surfaces therein for driving connection to a stem having mating wrench surfaces thereon;
 a pinion fixedly attached to said shaft within said piston passageway;
 a pair of pistons tightly disposed in said piston passageway on axially opposite sides of said pinion and movable in said piston passageway toward and away from said pinion, each of said pistons having an integral piston skirt extending axially from said piston along said piston passageway toward said pinion, said piston skirts being radially opposite each other in said piston passageway, each having a gear rack operatively engaging said pinion;
 a pair of end plates removably secured to said housing at opposite ends of said piston passageway so as to close said passageway;
 said housing further having a first porting passageway therein extending from an exterior surface of said housing to the interior of said piston passageway between said pistons, a second porting passageway extending longitudinally through said housing substantially parallel to said piston passageway, and a third porting passageway extending from an exterior surface of said housing to said second porting passageway;
 said end plates each having an internal porting passageway system therethrough, said system having two openings, one opening of said internal porting system communicating with one end of said second porting passageway, the other opening of said internal porting system communicating with the end of said piston passageway axially outwardly of said piston.

2. A fluid powered actuator comprising:

a housing having a cylindrical piston passageway therethrough and a shaft bore therein, said shaft bore being transverse to and intersecting said piston passageway;

a shaft rotatably mounted in said shaft bore and extending through said piston passageway, said shaft having a longitudinal rod receiving bore extending into one end of said shaft, said rod receiving bore having wrench surfaces therein;

a pinion fixedly attached to said shaft within said piston passageway;

a pair of pistons tightly disposed in said piston passageway on axially opposite sides of said pinion and movable in said piston passageway toward and away from said pinion, each of said pistons having an integral piston skirt extending axially from said piston along said piston passageway toward said pinion, said piston skirts being radially opposite each other in said piston passageway, each having a gear rack operatively engaging said pinion;

a pair of end plates removably secured to said housing at opposite ends of said piston passageway so as to close said passageway;

said housing further having a first porting passageway therein extending from an exterior surface of said housing to the interior of said piston passageway between said pistons, a second porting passageway extending longitudinally through said housing substantially parallel to said piston passageway, and a third porting passageway extending from an exterior surface of said housing to said second porting passageway;

said end plates each having an internal porting passageway system therethrough, said system having two openings, one opening of said internal porting system communicating with one end of said second portion passageway, the other opening of said internal porting system communicating with the end of said piston passageway axially outwardly of said piston;

and manual override means operatively connected to said shaft for manually rotating said shaft, said manual override means including a rod slidably disposed in said rod receiving bore and having wrench surfaces engageable with the wrench surfaces of said bore to prevent relative rotation between said shaft and said rod, said manual override means further including withdrawing means for withdrawing said rod at least partially out of said bore whereby said rod can be gripped and rotated thereby rotating said shaft.

3. The actuator of claim 2 wherein said rod is disposed entirely within said rod receiving bore when said manual override means is not in use.

4. The actuator of claim 3 further including sealing means adapted to be disposed in the end of said rod receiving bore when said manual override means is not in use.

5. The actuator of claim 4, wherein said sealing means comprises resilient sealing means, said sealing means having a cap portion and a hub portion, said hub portion extending into said rod receiving bore, said sealing means having a hole extending through said cap portion and said hub portion, said hub having a bore therein communicating with said hole, said rod having a tapered end portion receivable in the bore of said hub and having an axially extending threaded hole, a threaded stud extending through said hole in said cap and said hub and engageable with said threaded hole in said rod whereby the outer surfaces of said hub are forced outwardly against the surfaces of said rod receiving bore when said stud is screwed into said bore in said rod.

6. A valve and valve actuator combination comprising:

a valve body having a longitudinal flow passageway therethrough;

a valve stem extending transversely into said flow passageway and having a free end extending outwardly from said valve body;

a valve element rigidly mounted on said valve stem in said flow passageway, said valve stem being rotatable to turn said valve element from a first position closing said flow passageway to a second position opening said passageway;

an actuator housing having a cylindrical piston passageway therethrough, and a shaft bore therein, said shaft bore being transverse to and intersecting said piston passageway;

a shaft rotatably mounted in said shaft bore extending through said piston passageway and connected to said free end of said valve stem;

means preventing substantial relative rotation between said shaft and said valve stem;

a pinion fixedly attached to said shaft within said piston passageway;

a pair of pistons tightly disposed in said piston passageway on opposite sides of said pinion and movable in said piston passageway toward and away from said pinion, each of said pistons having an integral piston skirt extending axially from said piston along said piston passageway toward said pinion, said piston skirts being radially opposite each other in said piston passageway, each having a gear rack operatively engaging said pinion;

and a pair of end plates removably secured to said housing at opposite ends of said piston passageway so as to close said passageway;

said housing further having a first porting passageway therein extending from an exterior surface of said actuator housing to the interior of said piston passageway between said pistons, a second porting passageway extending longitudinally through said housing substantially parallel to said piston passageway, and a third porting passageway extending from an exterior surface of said housing to said second porting passageway;

said end plates each having an internal porting passageway system therethrough, said system having two openings, one opening of said internal porting system communicating with one end of said second porting passageway, the other opening of said internal porting system communicating with the end of said piston passageway axially outwardly of said piston.

7. The combination of claim 6 wherein said shaft has a longitudinal stem bore in the end connected to said free end of said valve stem, said stem bore having wrench surfaces therein, said valve stem having mating wrench surfaces on said free end and extending into said stem bore.

8. The combination of claim 6 further comprising manual override means operatively connected to said shaft for manually rotating said shaft.

9. The combination of claim 8 wherein said shaft has a longitudinal rod receiving bore extending into one end of said shaft, said rod receiving bore having wrench surfaces therein, and wherein said manual override means includes a rod slidably disposed in said rod receiving bore and having wrench surfaces engageable with the wrench surfaces of said bore to prevent relative rotation between said shaft and said rod, said override means further including withdrawing means for withdrawing said rod at least partially out of said bore whereby said rod can be gripped and rotated thereby rotating said shaft.

10. The combination of claim 9 wherein said rod receiving bore extends through the entire length of said shaft, said rod being disposed in one end of said bore and said free end of said valve stem being disposed in the other end of said rod receiving bore, said valve stem having surfaces mating with the wrench surfaces of said rod receiving bore to prevent relative rotation between said valve stem and said shaft.

11. The combination of claim 9 further including sealing means adapted to be disposed in the end of said rod receiving bore when said manual override means is not in use.

12. The combination of claim 11 wherein said sealing means comprises resilient sealing means, said sealing means having a cap portion and a hub portion, said hub portion extending into said rod receiving bore, said sealing means having a hole extending through said cap portion and said hub portion, said hub having a bore therein communicating with said hole, said rod having a tapered end portion receivable in the bore of said hub and having an axially extending threaded hole, a threaded stud extending through said hole in said cap and said hub and engageable with said threaded hole in said rod, whereby the outer surfaces of said hub are forced outwardly against the surfaces of said rod receiving bore when said stud is screwed into said bore in said rod.

13. A fluid powered actuator comprising:
a housing having a cylindrical piston passageway therethrough and a shaft bore therein, said shaft bore being transverse to and intersecting said piston passageway;
a shaft rotatably mounted in said shaft bore and extending through said piston passageway, said shaft having a longitudinal rod receiving bore extending into at least one end of said shaft, and said rod receiving bore having wrench surfaces therein;
a pinion fixedly attached to said shaft within said piston passageway;
a pair of pistons tightly disposed in said piston passageway on axially opposite sides of said pinion and movable in said piston passageway toward and away from said pinion, each of said pistons having an integral piston skirt extending axially from said piston along said piston passageway toward said pinion, said piston skirts being radially opposite each other in said piston passageway, each having a gear rack operatively engaging said pinion;
first means for providing fluid communication from the exterior of said housing to the interior of said piston passageway between said pistons;
second means for providing fluid communication from the exterior of said housing to the ends of said piston passageway axially outwardly of said pistons;
and manual override means operatively connected to said shaft for manually rotating said shaft, said manual override means including a rod slidably disposed in said rod receiving bore and having wrench surfaces engageable with the wrench surfaces of said bore to prevent relative rotation between said shaft and said rod, said manual override means further including withdrawing means for withdrawing said rod at least partially out of said bore whereby said rod can be gripped and rotated thereby rotating said shaft.

14. A valve and valve actuator combination comprising:
a valve body having a longitudinal flow passageway therethrough;
a valve stem extending transversely into said flow passageway and having a free end extending outwardly from said valve body;
a valve element rigidly mounted on said valve stem in said flow passageway, said valve stem being rotatable to turn said valve element from a first position closing said flow passageway to a second position opening said passageway;
an actuator housing having a cylindrical piston passageway therethrough, and a shaft bore therein, said shaft bore being transverse to and intersecting said piston passageway;
a shaft rotatably mounted in said shaft bore extending through said piston passageway and connected to said free end of said valve stem said shaft having a longitudinal rod receiving bore extending into one end of said shaft, and said rod receiving bore having wrench surfaces therein;
means preventing substantial relative rotation between said shaft and said valve stem;
a pinion fixedly attached to said shaft within said piston passageway;
a pair of pistons tightly disposed in said piston passageway on opposite sides of said pinion and movable in said piston passageway toward and away from said pinion, each of said pistons having an integral piston skirt extending axially from said piston along said piston passageway toward said pinion, said piston skirts being radially opposite each other in said piston passageway, each having a gear rack operatively engaging said pinion;
first means for providing fluid communication from the exterior of said housing to the interior of said piston passageway between said pistons;
second means for providing fluid communication from the exterior of said housing to the ends of said piston passageway axially outwardly of said pistons;
and manual override means operatively connected to said shaft for manually rotating said shaft, said manual override means including a rod slidably disposed in said rod receiving bore and having wrench surfaces engageable with the wrench surfaces of said bore to prevent relative rotation between said shaft and said rod, said manual override means further including withdrawing means for withdrawing said rod at least partially out of said bore whereby said rod can be gripped and rotated thereby rotating said shaft.

* * * * *